(12) United States Patent
Pinarbasi

(10) Patent No.: US 6,219,207 B1
(45) Date of Patent: Apr. 17, 2001

(54) READ SENSOR HAVING HIGH CONDUCTIVITY MULTILAYER LEAD STRUCTURE WITH A MOLYBDENUM LAYER

(75) Inventor: Mustafa Pinarbasi, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/299,772

(22) Filed: Apr. 26, 1999

(51) Int. Cl.$^7$ ........................................................ G11B 5/39
(52) U.S. Cl. ........................................ 360/322; 360/324.1
(58) Field of Search ..................... 360/317, 322, 360/324.1, 324.11, 324.12

(56) References Cited

U.S. PATENT DOCUMENTS

| | | | |
|---|---|---|---|
| 5,666,246 | * | 9/1997 | Gill et al. .............................. 360/113 |
| 5,777,542 | * | 7/1998 | Ohsawa et al. .................... 338/32 R |
| 5,828,532 | * | 10/1998 | Ahlert et al. ......................... 360/113 |
| 5,946,167 | * | 8/1999 | Hara et al. ........................... 360/113 |
| 6,010,781 | * | 1/2000 | Aoshima et al. .................... 428/332 |
| 6,087,027 | * | 7/2000 | Hoshiya et al. ..................... 428/692 |
| 6,094,325 | * | 7/2000 | Tagawa et al. ...................... 360/113 |

* cited by examiner

*Primary Examiner*—Jefferson Evans
(74) *Attorney, Agent, or Firm*—Gray Care Ware & Freidenrich LLP; Ervin F. Johnston

(57) ABSTRACT

First and second lead layer structures are provided for a read sensor which have low resistance, hardness and reliability at operating temperatures of the read head. Each lead layer structure includes a layer of molybdenum (Mo) on a seed layer structure including a layer of tantalum (Ta) and/or a seed layer of chromium (Cr).

20 Claims, 12 Drawing Sheets

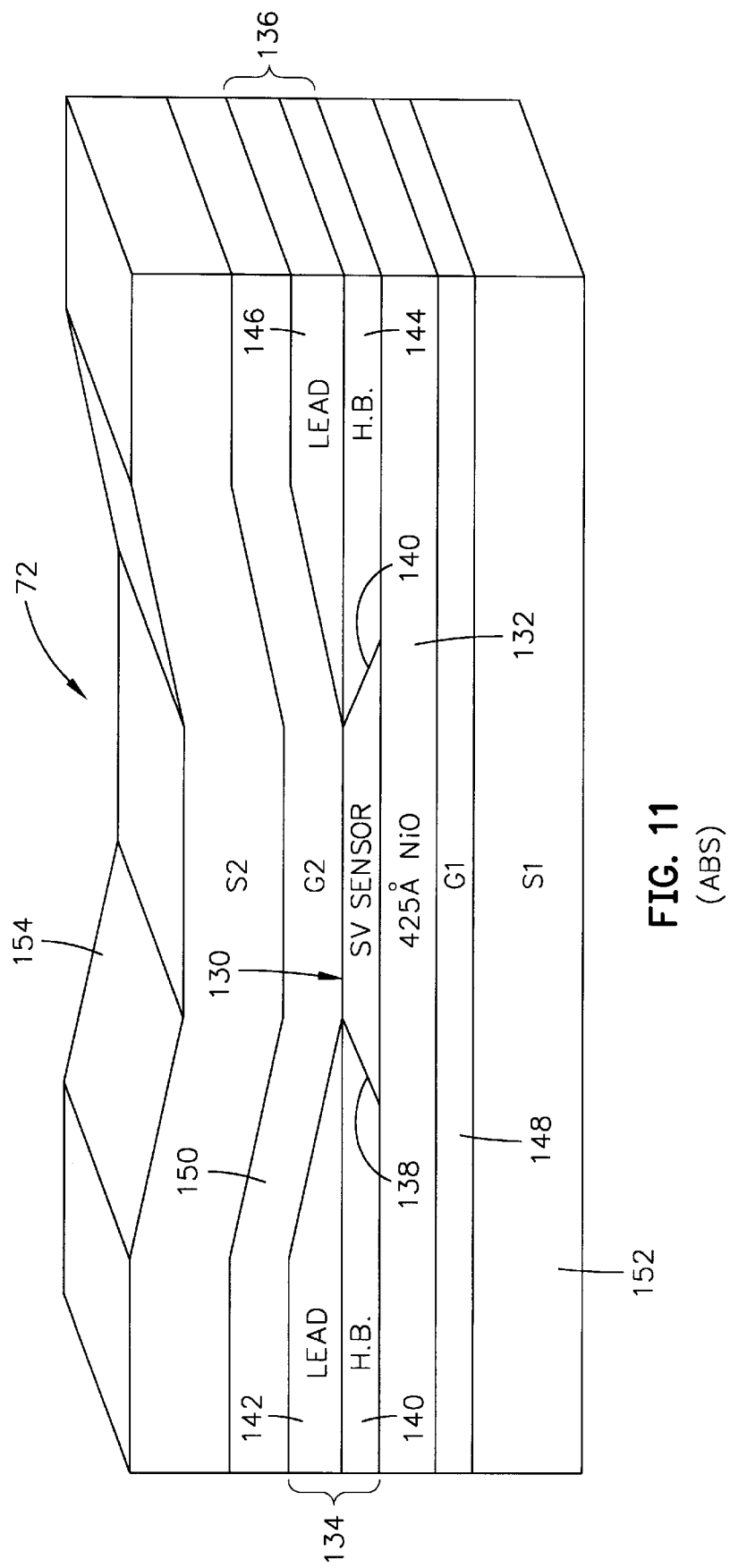
FIG. 11 (ABS)

READ SENSOR HAVING HIGH CONDUCTIVITY MULTILAYER LEAD STRUCTURE WITH A MOLYBDENUM LAYER

BACKGROUND OF THE INVENTION

1. Field of the Invention

The present invention relates to a high conductivity multilayer lead structure with a molybdenum layer for a read sensor and, more particularly, to a lead layer structure that has a molybdenum layer on a seed layer structure which provides conductivity nearly equivalent to a tantalum (Ta) and gold (Au) multilayer lead structure.

2. Description of the Related Art

The heart of a computer is an assembly that is referred to as a magnetic disk drive. The magnetic disk drive includes a rotating magnetic disk, a slider that has write and read heads, a suspension arm that supports the slider above the rotating disk and an actuator that swings the suspension arm to place the read and write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic impressions from the rotating disk. The read and write heads are connected to processing circuitry that operates according to a computer program to implement the writing and reading functions.

The write head includes a coil layer embedded in first, second and third insulation layers (insulation stack), the insulation stack being sandwiched between first and second pole piece layers. A gap is formed between the first and second pole piece layers by a nonmagnetic gap layer at an air bearing surface (ABS) of the write head. The pole piece layers are connected at a back gap. Current conducted to the coil layer induces a magnetic field into the pole pieces that fringes across the gap between the pole pieces at the ABS. The fringe field or the lack thereof writes information in tracks on moving media, such as in circular tracks on a rotating disk.

The read head includes a sensor that is located between nonmagnetic nonconductive first and second read gap layers and the first and second read gap layers are located between ferromagnetic first and second shield layers. In recent read heads a spin valve sensor is employed for sensing magnetic fields from the rotating magnetic disk. The sensor includes a nonmagnetic conductive layer, hereinafter referred to as a spacer layer, sandwiched between first and second ferromagnetic layers, hereinafter referred to as a pinned layer, and a free layer. First and second leads are connected to the spin valve sensor for conducting a sense current therethrough. The magnetization of the pinned layer is pinned perpendicular to an air bearing surface (ABS) of the head and the magnetic moment of the free layer is located parallel to the ABS but free to rotate in response to external magnetic fields. The magnetization of the pinned layer is typically pinned by exchange coupling with an antiferromagnetic layer.

The spin valve sensor is characterized by a magnetoresistive (MR) coefficient that is substantially higher than the MR coefficient of an anisotropic magnetoresistive (AMR) sensor. MR coefficient is dr/R were dr is the change in resistance of the spin valve sensor in response to signal fields and R is the resistance of the spin valve sensor before the change in resistance.

The read sensor, which may be a spin valve sensor or an AMR sensor, is bounded by a first edge at the ABS, a recessed edge spaced from the ABS and first and second side edges. First and second lead layers are connected to the first and second side edges respectively of the read sensor for the purpose of conducting the sense current therethrough. This type of connection is known in the art as a contiguous junction. Another type of connection is a continuous junction which is when the first and second lead layers overlap side portions of the read sensor layers with a space therebetween that defines the track width of the read head. It is important that the lead layers have low conductivity and be capable of withstanding operating temperatures in a magnetic disk drive which may be 80° C.–120° C. Low conductivity is important for minimizing heat and noise generated by the lead layers. If the lead layers have a high resistance they must be made thicker in order to reduce the heat and noise produced by the lead layers. Unfortunately, thicker lead layers increase the profile of the read head on each side of the sensor which is replicated in subsequent layers all the way to the write gap layer in the write head. This can cause write gap curvature which will cause the write head to write curved magnetic impressions into circular tracks on a rotating magnetic disk. This is undesirable since the read head reads straight across and will lose a portion of the signal at the outer edges of the magnetic impressions.

A typical material employed for lead layers is tantalum (Ta). While tantalum (Ta) operates well at operating temperatures it has a high resistance and suffers from the disadvantages described hereinabove. The resistance of a typical tantalum (Ta) lead layer can range from 2.2 to 2.8 ohms/sq. Gold (Au) is a desirable substitute for tantalum (Ta) because gold has a low resistance. A typical gold/nickel (Au/Ni) or gold/tantalum (Au/Ta) multilayer can have a resistance of about 1.0 ohms/sq. While such multilayers are very desirable from the standpoint of their conductivity, gold (Au) has not been able to withstand the aforementioned operating temperatures of the read head. The lead layers have edges at the ABS in the same manner as the layers that make up the read sensor. At operating temperatures the heat and attendant stresses cause the gold to ooze at the ABS like toothpaste. A contributing factor may be the expansion of layers in the read head which are adjacent the lead layers. Oozing of the gold at the ABS degrades the performance of the lead layers and can short the lead layers to the first and second shield layers, as well as shorting across edges of sensitive layers of the read sensor. Accordingly, there is a strong-felt need to provide lead layers that have a low resistance similar to gold but hard enough to withstand operating temperatures of the read head.

SUMMARY OF THE INVENTION

The lead layers of the present invention include a layer of molybdenum (Mo) and a seed layer structure. The seed layer structure includes a layer of tantalum (Ta) and/or a layer of chromium (Cr). In a preferred embodiment a seed layer of chromium (Cr) is located between a seed layer of tantalum (Ta) and the layer of molybdenum (Mo). The resistance of a lead layer with such a structure can range from 1.14 to 1.45 ohms/sq. The 1.14 resistance value is nearly as low as the 1.0 resistance value for the aforementioned tantalum (Ta) and gold (Au) multilayer lead structure of the same thickness. Further, the present molybdenum (Mo) layer and seed layer structure can easily withstand the operating temperatures of the read head. Since molybdenum (Mo) is a harder material than gold (Au) there is no oozing of the molybdenum at the ABS.

An object of the present invention is to provide lead layers for a read sensor which have low resistance and reliability at operating temperatures of the read head.

A further object is to provide a low resistance seed layer structure for a molybdenum (Mo) layer in a lead layer structure which increases the conductivity of the molybdenum (Mo) layer.

Other objects and advantages of the invention will become apparent upon reading the following description taken together with the accompanying drawings.

BRIEF DESCRIPTION OF THE DRAWINGS

FIG. 11 is an isometric ABS illustration of a read head;

DESCRIPTION OF THE PREFERRED EMBODIMENTS

Magnetic Disk Drive

Figure 1:
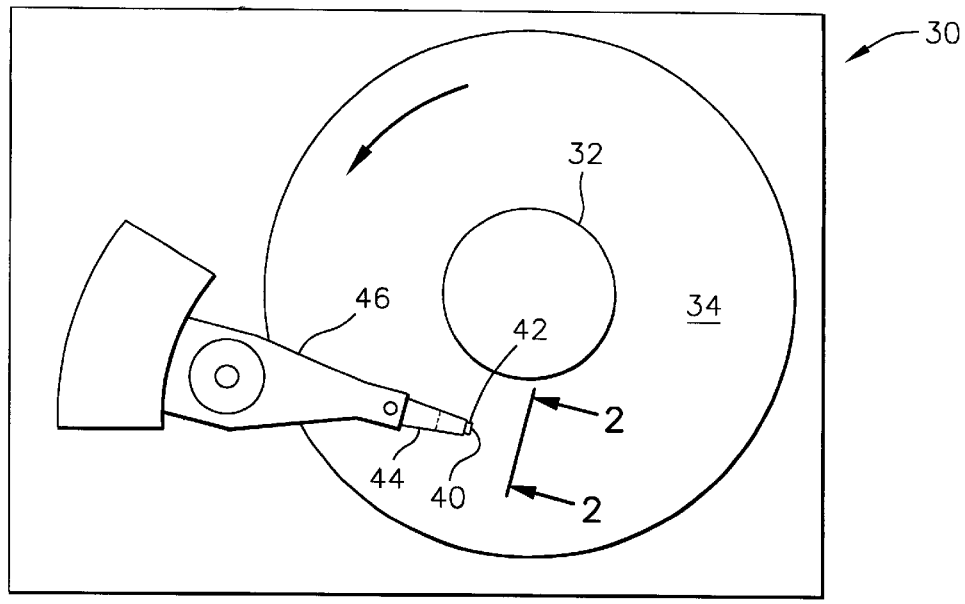
FIG. 1 is a plan view of an exemplary magnetic disk drive.
Figure 2:
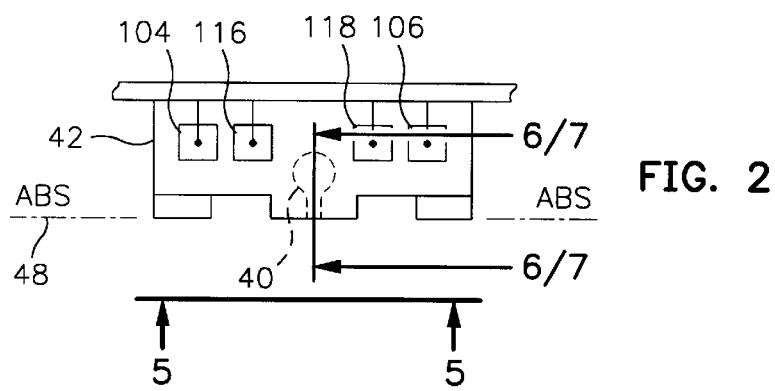
FIG. 2 is an end view of a slider with a magnetic head of the disk drive as seen in plane 2—2.
Figure 3:
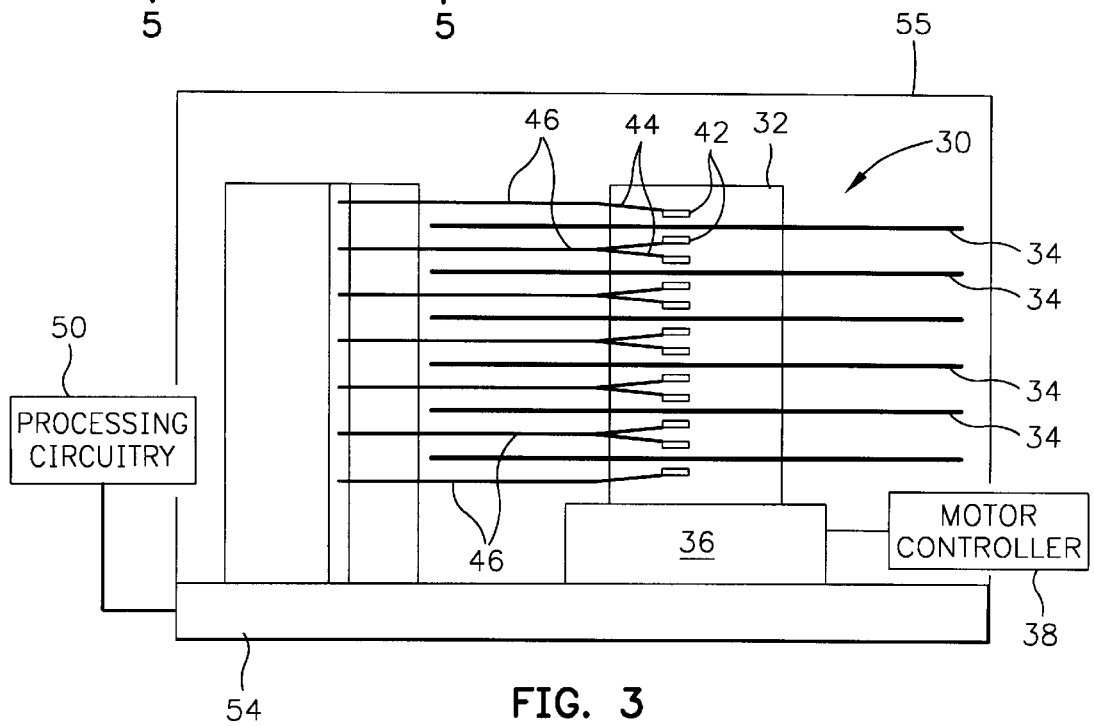
FIG. 3 is an elevation view of the magnetic disk drive wherein multiple disks and magnetic heads are employed.
Figure 4:
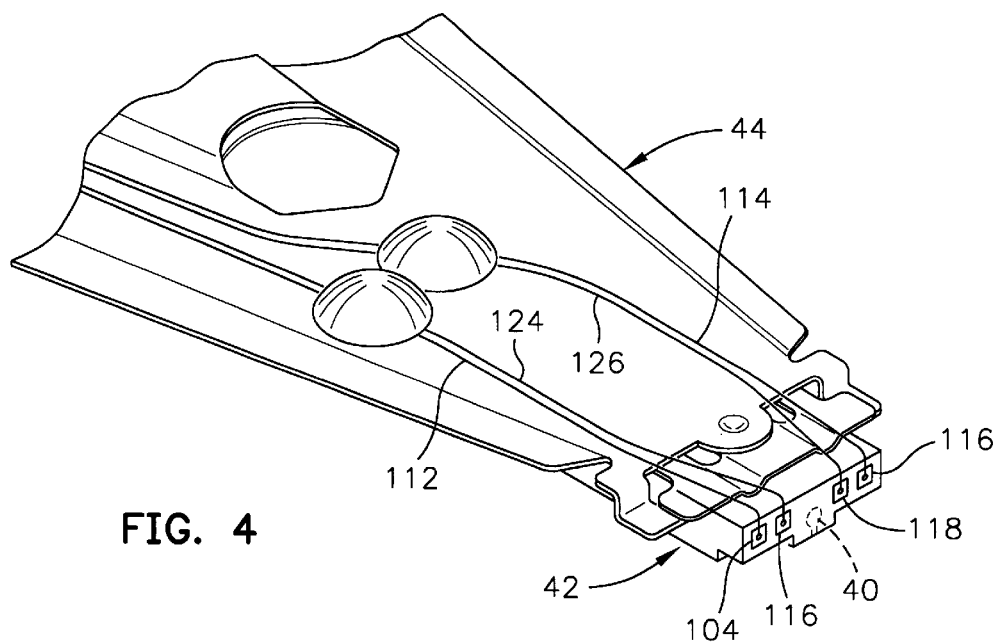
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a motor 36 that is controlled by a motor controller 38. A slider 42 has a combined read and write magnetic head assembly 40 and is supported by a suspension 44 and actuator arm 46. A plurality of disks, sliders and suspensions may be employed in a large capacity direct access storage device (DASD) as shown in FIG. 3. The suspension 44 and actuator arm 46 position the slider 42 so that the magnetic head 40 assembly is in a transducing relationship with a surface of the magnetic disk 34. When the disk 34 is rotated by the motor 36 the slider is supported on a thin (typically, 0.05 $\mu$m) cushion of air (air bearing) between the surface of the disk 34 and the air bearing surface (ABS) 48. The magnetic head assembly 40 may then be employed for writing information to multiple circular tracks on the surface of the disk 34, as well as for reading information therefrom. Processing circuitry 50 exchanges signals, representing such information, with the head assembly 40, provides motor drive signals for rotating the magnetic disk 34, and provides control signals for moving the slider to various tracks. In FIG. 4 the slider 42 is shown mounted to the suspension 44. The components described hereinabove may be mounted on a frame 54 of a housing, as shown in FIG. 3.

Figure 5:
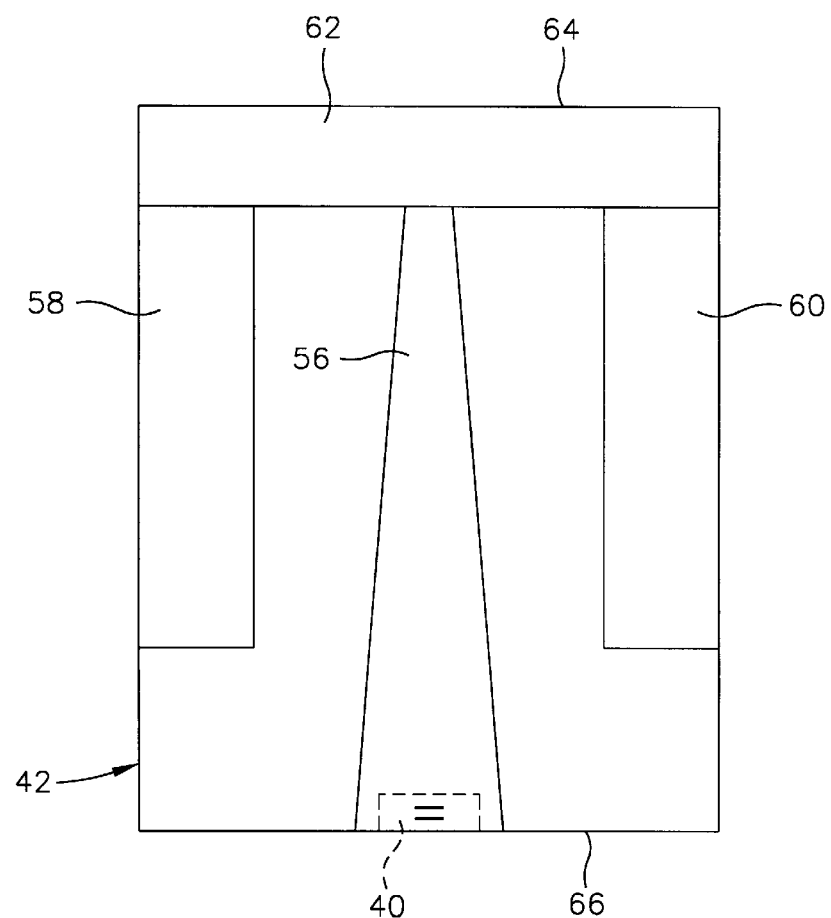
FIG. 5 is an ABS view of the magnetic head taken along plane 5—5 of FIG. 2.

FIG. 5 is an ABS view of the slider 42 and the head 40. The slider has a center rail 56 that supports the magnetic head assembly 40, and side rails 58 and 60. The rails 56, 58 and 60 extend from a cross rail 62. With respect to rotation of the magnetic disk 34, the cross rail 62 is at a leading edge 64 of the slider and the magnetic head assembly 40 is at a trailing edge 66 of the slider.

Figure 6:
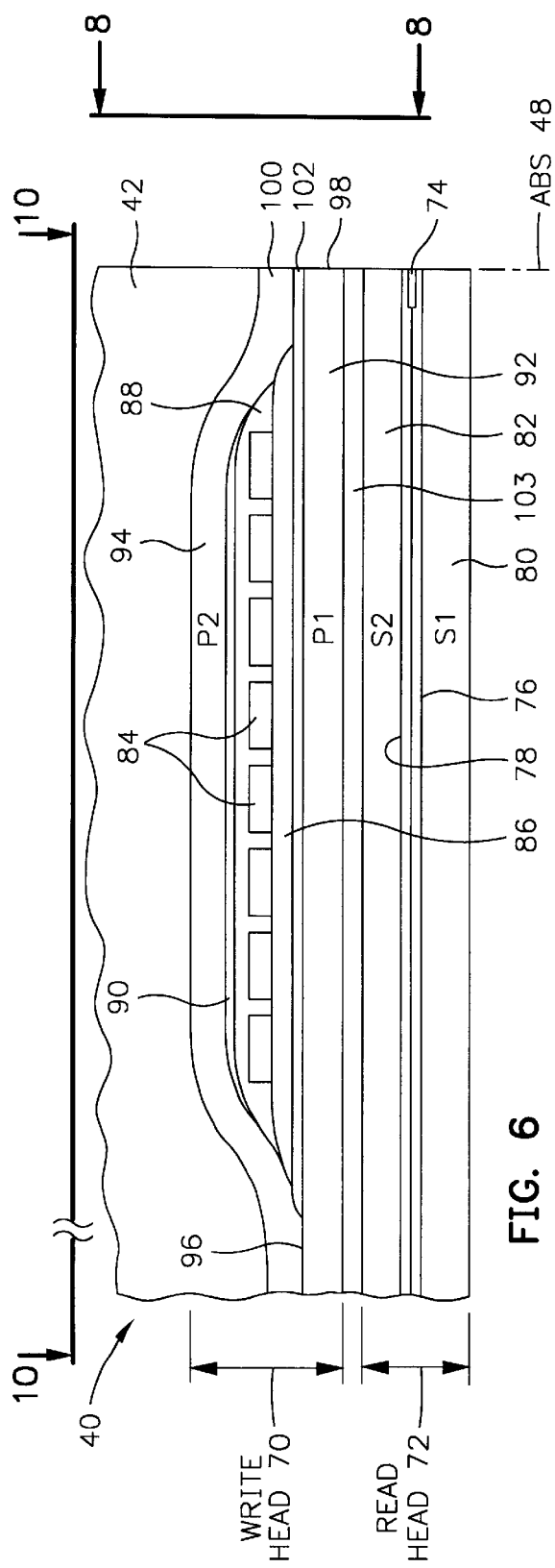
FIG. 6 is a partial view of the slider and a piggyback magnetic head as seen in plane 6—6 of FIG. 2.
Figure 8:
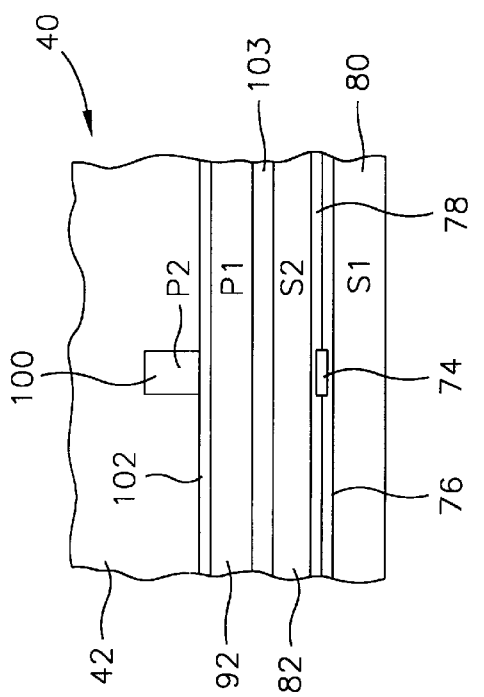
FIG. 8 is a partial ABS view of the slider taken along plane 8—8 of FIG. 6 to show the read and write elements of the piggyback magnetic head.

FIG. 6 is a side cross-sectional elevation view of a piggyback magnetic head assembly 40, which includes a write head portion 70 and a read head portion 72, the read head portion employing an exemplary spin valve sensor 74. FIG. 8 is an ABS view of FIG. 6. The spin valve sensor 74 is sandwiched between nonmagnetic nonconductive first and second read gap layers 76 and 78, and the read gap layers are sandwiched between ferromagnetic first and second shield layers 80 and 82. In response to external magnetic fields, the resistance of the spin valve sensor 74 changes. A sense current $I_S$ conducted through the sensor causes these resistance changes to be manifested as potential changes. These potential changes are then processed as readback signals by the processing circuitry 50 shown in FIG. 3.

The write head portion 70 of the magnetic head assembly 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. An insulation layer 103 is located between the second shield layer 82 and the first pole piece layer 92. Since the second shield layer 82 and the first pole piece layer 92 are separate layers this head is known as a piggyback head. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 8) to leads 124 and 126 on the suspension.

Figure 7:
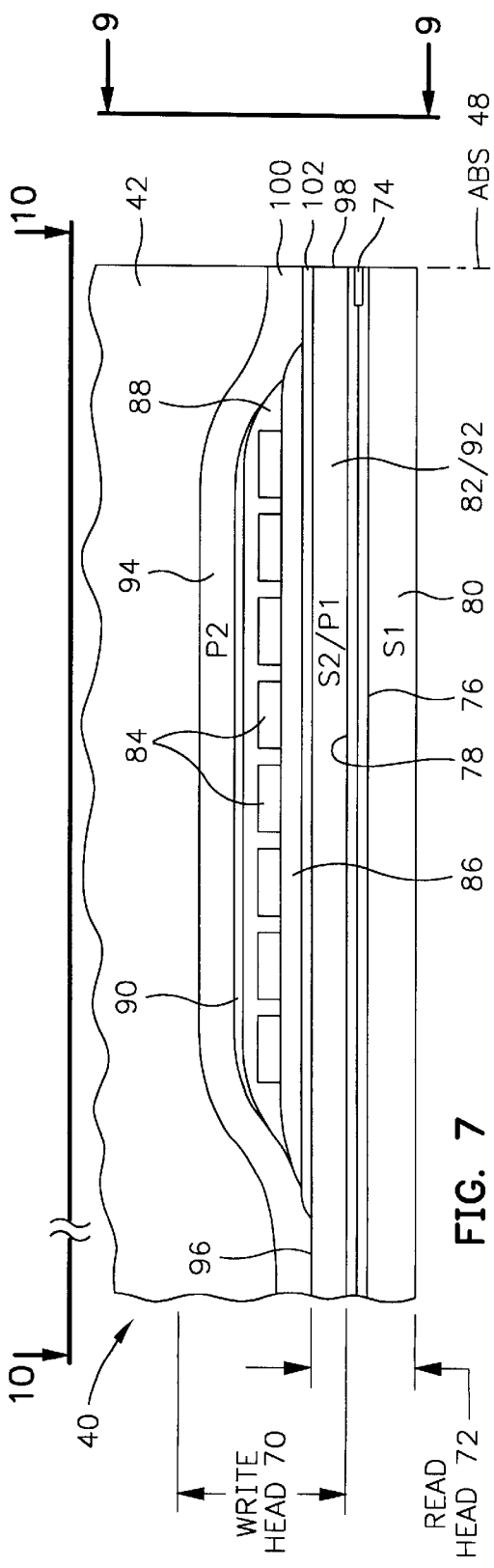
FIG. 7 is a partial view of the slider and a merged magnetic head as seen in plane 7—7 of FIG. 2.
Figure 10:
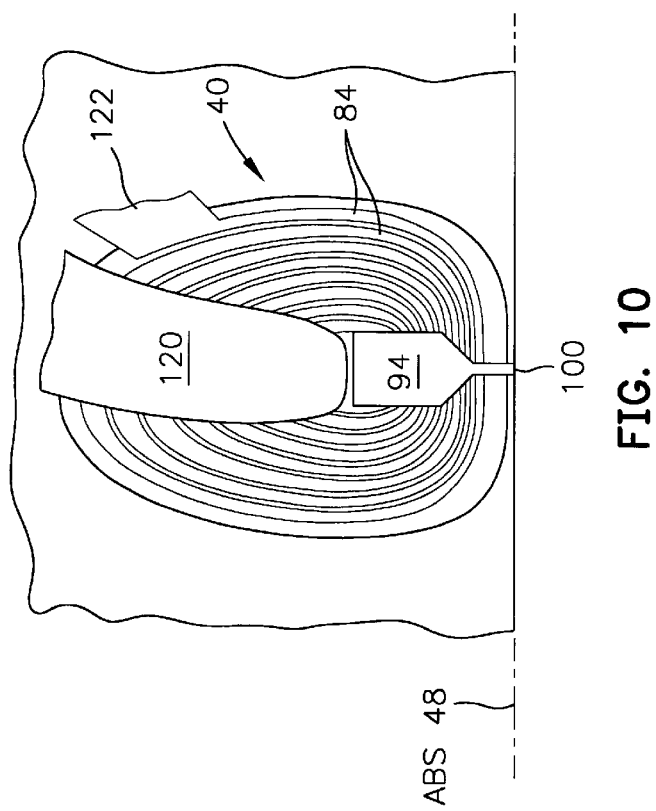
FIG. 10 is a view taken along plane 10—10 of FIGS. 6 or 7 with all material above the coil layer and leads removed.
Figure 9:
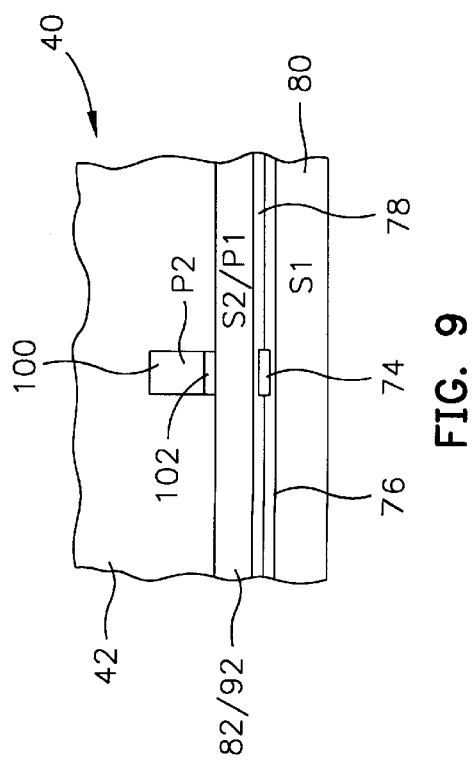
FIG. 9 is a partial ABS view of the slider taken along plane 9—9 of FIG. 7 to show the read and write elements of the merged magnetic head.

FIGS. 7 and 9 are the same as FIGS. 6 and 8 except the second shield layer 82 and the first pole piece layer 92 are a common layer. This type of head is known as a merged magnetic head. The insulation layer 103 of the piggyback head in FIGS. 6 and 8 is omitted.

FIG. 11 is an isometric ABS illustration of the read head 72 shown in FIGS. 6 or 8. The read head 72 includes an exemplary spin valve sensor 130 which is located on an antiferromagnetic (AFM) pinning layer 132. A ferromagnetic pinned layer in the spin valve sensor 130 is pinned by the magnetic spins of the pinning layer 132. The AFM pinning layer may be 425 Å of nickel oxide (NiO). First and second hard bias and lead layers 134 and 136 are connected to first and second side edges 138 and 140 of the spin valve sensor. This connection is known in the art as a contiguous junction and is fully described in commonly assigned U.S. Pat. No. 5,018,037. Optionally, the connection may be a continuous junction in which first and second hard bias and lead layers extend over and are coupled to first and second side portions of spin valve sensor layers on each side of sensor portions of these layers. The first hard bias and lead layers 134 include a first hard bias layer 140 and a first lead layer 142 and the second hard bias and lead layers 136 include a second hard bias layer 144 and a second lead layer 146. The hard bias layers 140 and 144 cause magnetic fields to extend longitudinally through the spin valve sensor 130 for stabilizing the magnetic domains therein. The AFM pinning layer 132, the spin valve sensor 130 and the first and second hard bias and lead layers 134 and 136 are located between nonmagnetic nonconductive first and second read gap layers 148 and 150. The first and second read gap layers 148 and 150 are, in turn, located between ferromagnetic first and second shield layers 152 and 154.

EXAMPLE 1

Figure 12:
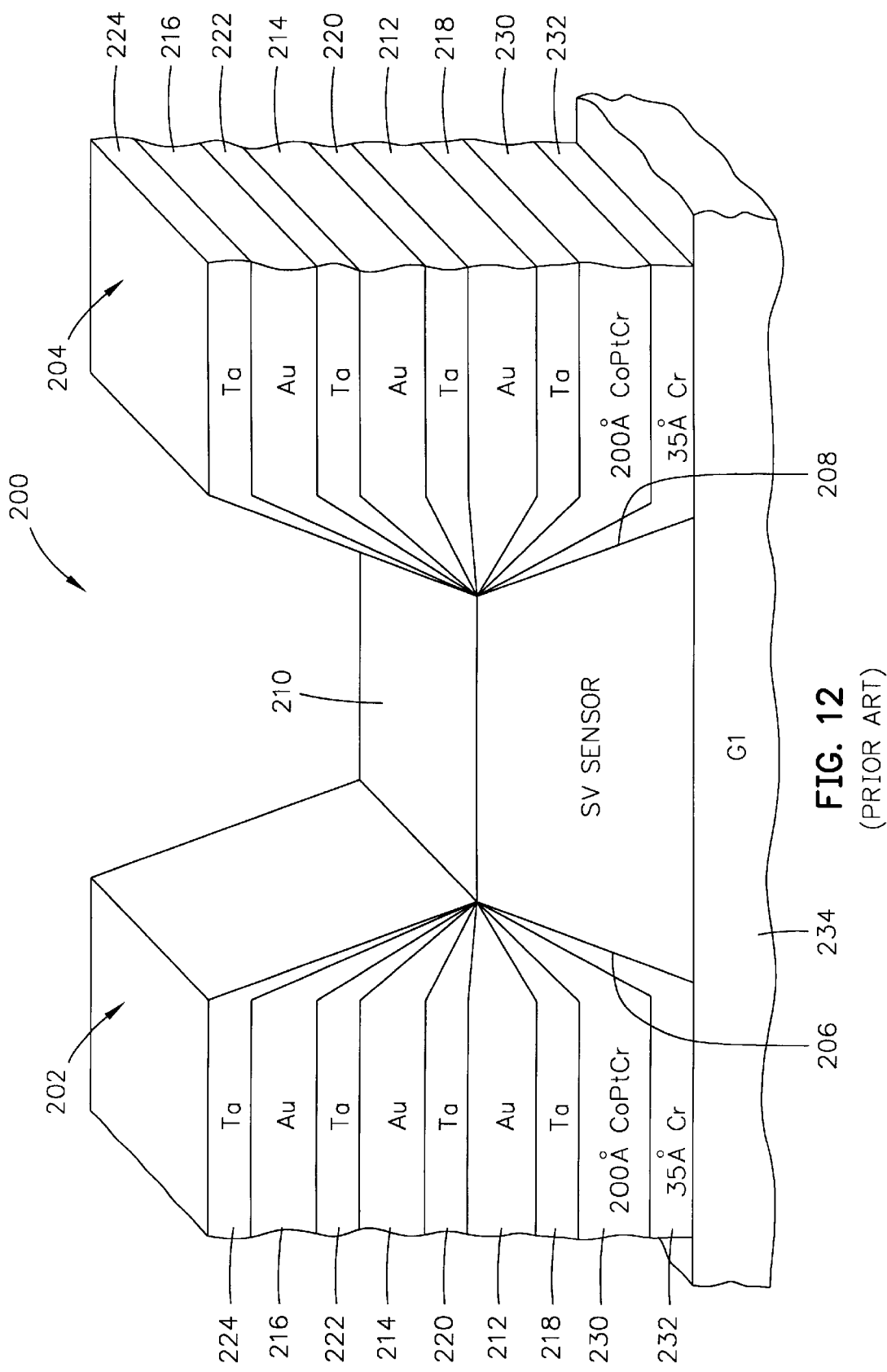
FIG. 12 is an ABS illustration of a first example of first and second lead layer structures employing multilayers of gold (Au) and tantalum (Ta)

FIG. 12 shows an ABS illustration of a first example 200 of first and second lead layer structures 202 and 204. The lead layer structures 202 and 204 are electrically connected to first and second side edges 206 and 208 of a read sensor 210 which may be a spin valve sensor or an AMR sensor. The read sensor 210 is further bounded by its edge at the ABS, which is in the plane of the paper in FIG. 12, and a recessed edge, which is shown in FIGS. 6 and 8. Each lead layer structure 202 and 204 includes first, second and third gold (Au) layers 212, 214 and 216, which are interlayered with first, second, third and fourth tantalum (Ta) layers 218, 220, 222 and 224. The tantalum (Ta) layers are 50 Å thick and the gold (Au) layers are 200 Å thick.

In a typical read head employing a spin valve sensor, first and second hard bias layer structures for magnetically biasing the free layer of the spin valve sensor parallel to the ABS along its length between the first and second side edges 206 and 208. Each hard bias layer structure includes a cobalt platinum chromium (CoPtCr) layer 230 on a chromium (Cr) seed layer 232. The biasing is necessary for stabilizing the operation of the free layer. The cobalt platinum chromium (CoPtCr) layer 230 is 200 Å thick and the chromium (Cr) seed layer 232 is 35 Å thick. The first and second lead layer structures 202 and 204 are typically located on the first and second hard bias layer structures 226 and 228. The sensor 200, the first and second lead layer structures 202 and 204 and the first and second hard bias layer structures are located between first and second read gap layers, the first read gap layer (G1) 234 being shown in FIG. 12. The first and second gap layers (G1) and (G2) are located between first and second shield layers (S1) and (S2), as shown in FIG. 11.

The lead layer structures 202 and 204 in FIG. 12 have a very low resistance which is desirable for the purpose of reducing heat and noise generated within the read head. The resistance of each of the lead layers 202 and 204 is about 1.0 ohms/sq. Unfortunately the gold (Au) layers 212, 214 and 216 fail structurally during operating temperatures of the read head which may be 80° C.–120° C. At these temperatures and attendant stresses within the read head the gold oozes from the lead layer structures 202 and 204 at the ABS like toothpaste. This seriously degrades the performance of the lead layer structures 202 and 204 and can short the lead layer structures to the first and second shield layers at the ABS or short across edges of sensitive layers of the sensor at the ABS. Accordingly, I undertook a search for a lead layer structure which has low resistance comparable to the tantalum (Ta) and gold (Au) multilayer lead structure but with increased hardness and reliability to prevent oozing at the ABS.

EXAMPLE 2

Figure 13:
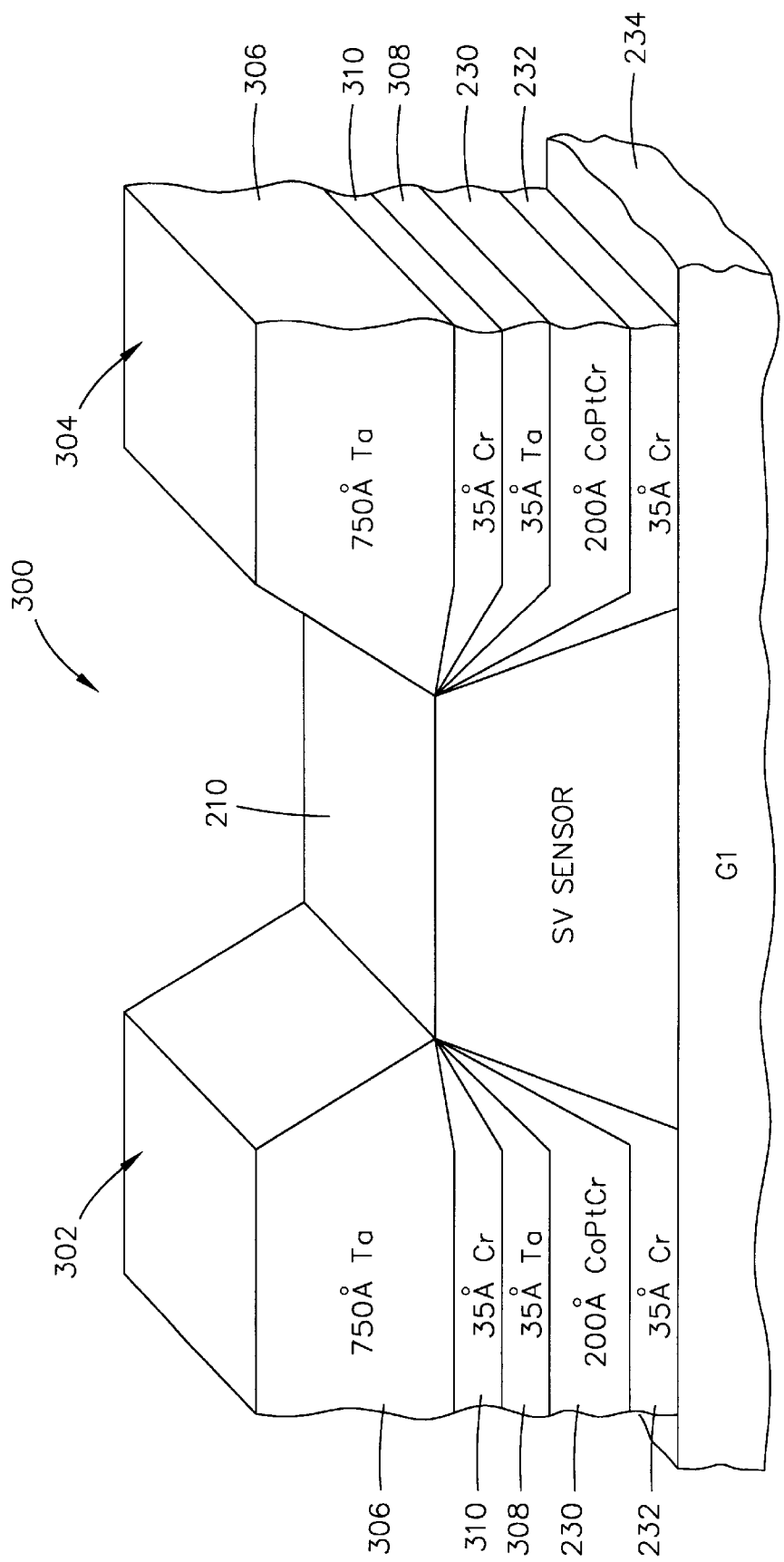
FIG. 13 is an ABS illustration of a second example of first and second lead layer structures employing tantalum (Ta)

FIG. 13 shows an ABS illustration of a second example 300 of first and second lead layer structures 302 and 304. The illustration in FIG. 13 is the same as the illustration in FIG. 12 except for the first and second lead layer structures 302 and 304. Each of the lead layer structures 302 and 304 includes a layer of tantalum (Ta) 306 on a multi seed layer structure which includes a first seed layer of tantalum (Ta) 308 and a second seed layer of chromium (Cr) 310. The tantalum (Ta) layer 306 is 750 Å thick and each of the seed layers 308 and 310 is 35 Å thick. The resistance of each of the lead layer structures 302 and 304 was 2.2 ohms/sq. which is more than twice the resistance of the gold lead layer structures 202 and 204 in FIG. 12. This high resistance is undesirable.

EXAMPLE 3

Figure 14:
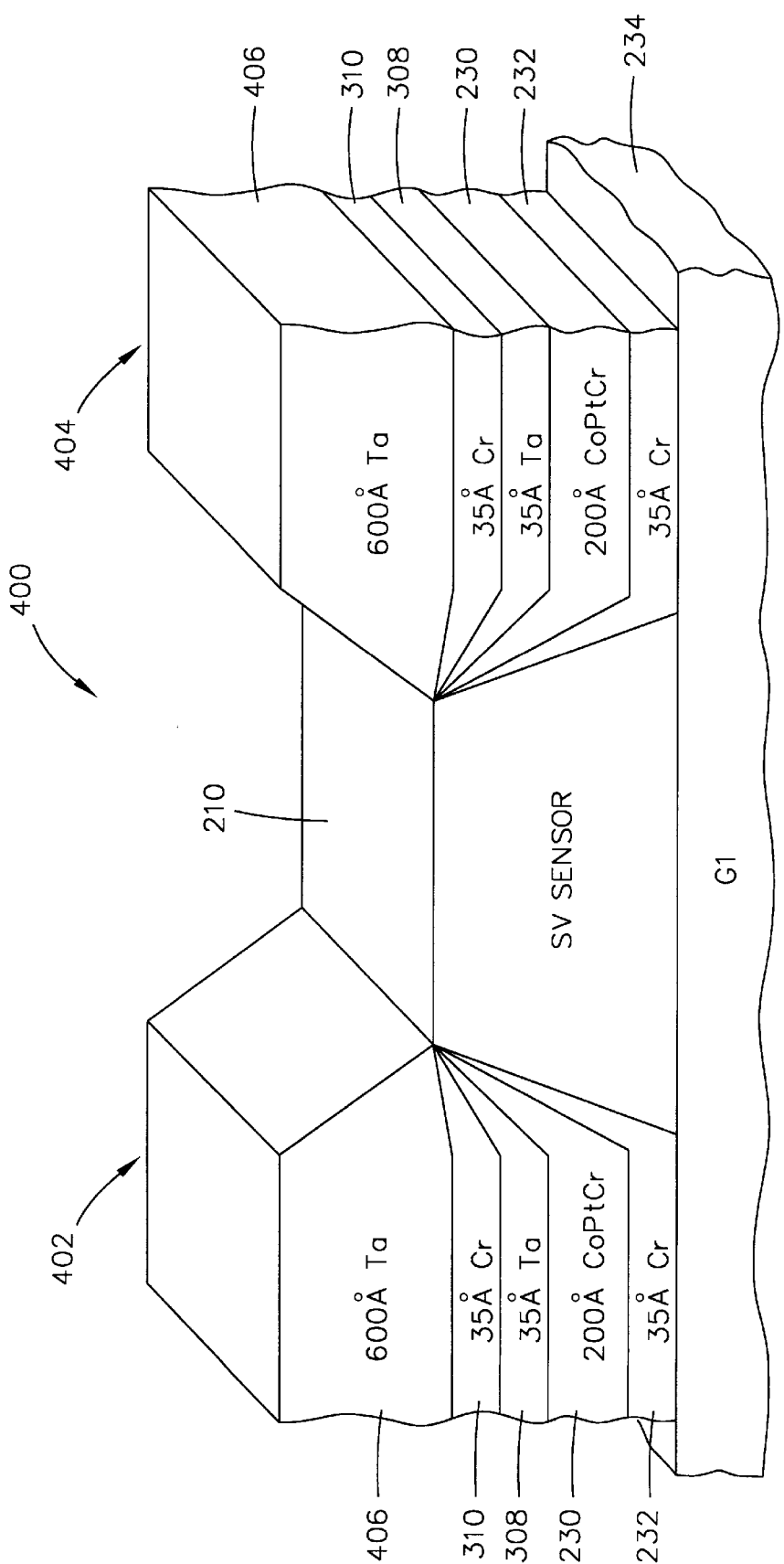
FIG. 14 is an ABS illustration of a third example of first and second lead layer structures employing tantalum (Ta)

FIG. 14 is an ABS illustration of a third example 400 of the first and second lead layer structures 402 and 404. The lead layer structures 402 and 404 are the same as the lead layer structures 302 and 304 in FIG. 13 except for the tantalum layers 406 which are 600 Å thick instead of 750 Å thick. The resistance of the first and second lead layer structures 402 and 404 in FIG. 14 was 2.8 ohms/sq. This is almost three times the resistance of the first and second gold lead layer structures 202 and 204 in FIG. 12.

EXAMPLE 4

First Embodiment of the Invention

Figure 15:
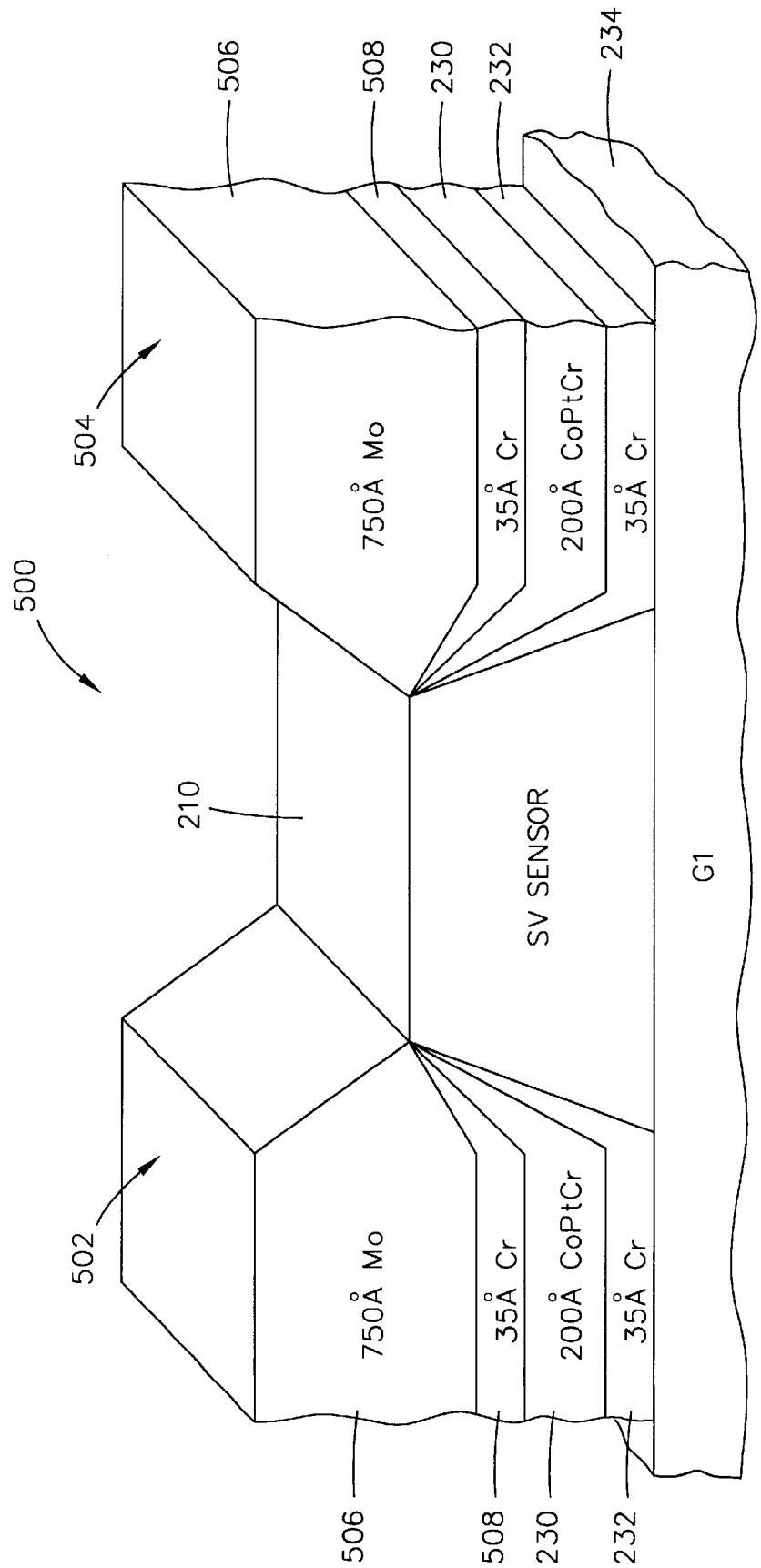
FIG. 15 is an ABS illustration of a fourth example and first embodiment of the invention of first and second lead layer structures employing molybdenum (Mo) on a chromium (Cr) seed layer.

FIG. 15 shows an ABS illustration of a fourth example 500 and first embodiment of the invention of first and second lead layer structures 502 and 504. Example 500 is the same as the example 200 shown in FIG. 12 except for the first and second lead layer structures 502 and 504. Each of the lead layer structures 502 and 504 includes a molybdenum (Mo) layer 506 on a chromium (Cr) seed layer 508. The molybdenum (Mo) layer 506 is 750 Å thick and the chromium (Cr) layer 508 is 35 Å thick. Molybdenum (Mo) is a desirable lead layer material because it has low resistance, it is hard and it is reliable at operating temperatures of the read head. The resistance of each of the first and second lead layer structures 502 and 504 was 1.7 ohms/sq. This is an improvement over the lead layer structures shown in FIGS. 13 and 14.

EXAMPLE 5

Second Embodiment of the Invention

Figure 16:
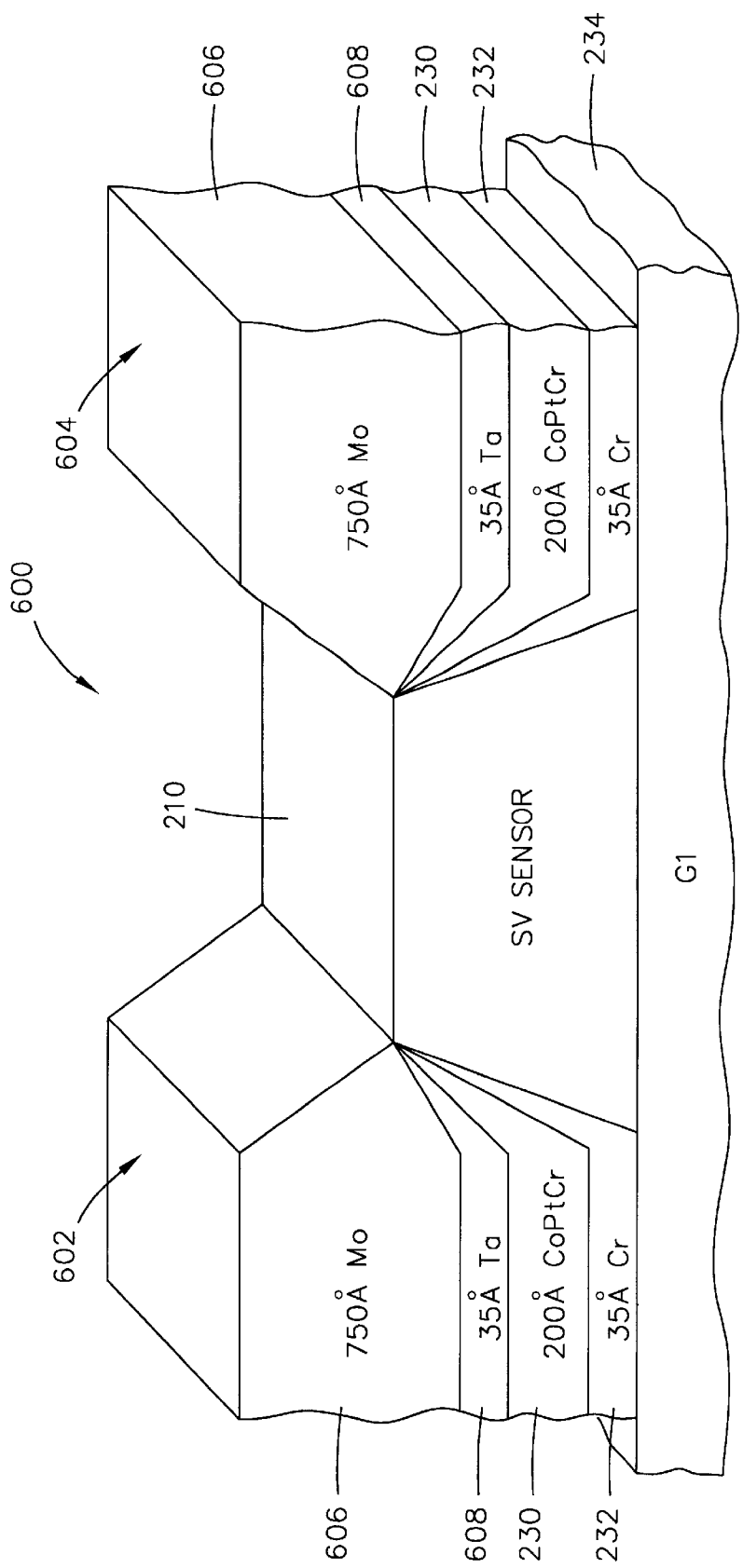
FIG. 16 is an ABS illustration of a fifth example and second embodiment of the invention of first and second lead layer structures employing molybdenum (Mo) on a tantalum (Ta) seed layer.

FIG. 16 is an ABS illustration of a fifth example 600 and second embodiment of the invention of first and second lead layer structures 602 and 604. Example 600 is the same as Example 200 in FIG. 12 except for the first and second lead layer structures 602 and 604. Each of the first and second lead layer structures 602 and 604 includes a molybdenum (Mo) layer 606 on a tantalum (Ta) seed layer 608. The molybdenum (Mo) layer 606 is 750 Å thick and the tantalum (Ta) layer 608 is 35 Å thick. The only difference between the example 600 in FIG. 16 and the example 500 in FIG. 15 is that a tantalum seed layer 608 is employed instead of a chromium (Cr) seed layer 508. The resistance of the first and second lead layer structures 602 and 604 was 2.0 ohms/sq. which is an improvement over the lead layer structures shown in FIGS. 13 and 14.

EXAMPLE 6

Third Embodiment of the Invention

Figure 17:
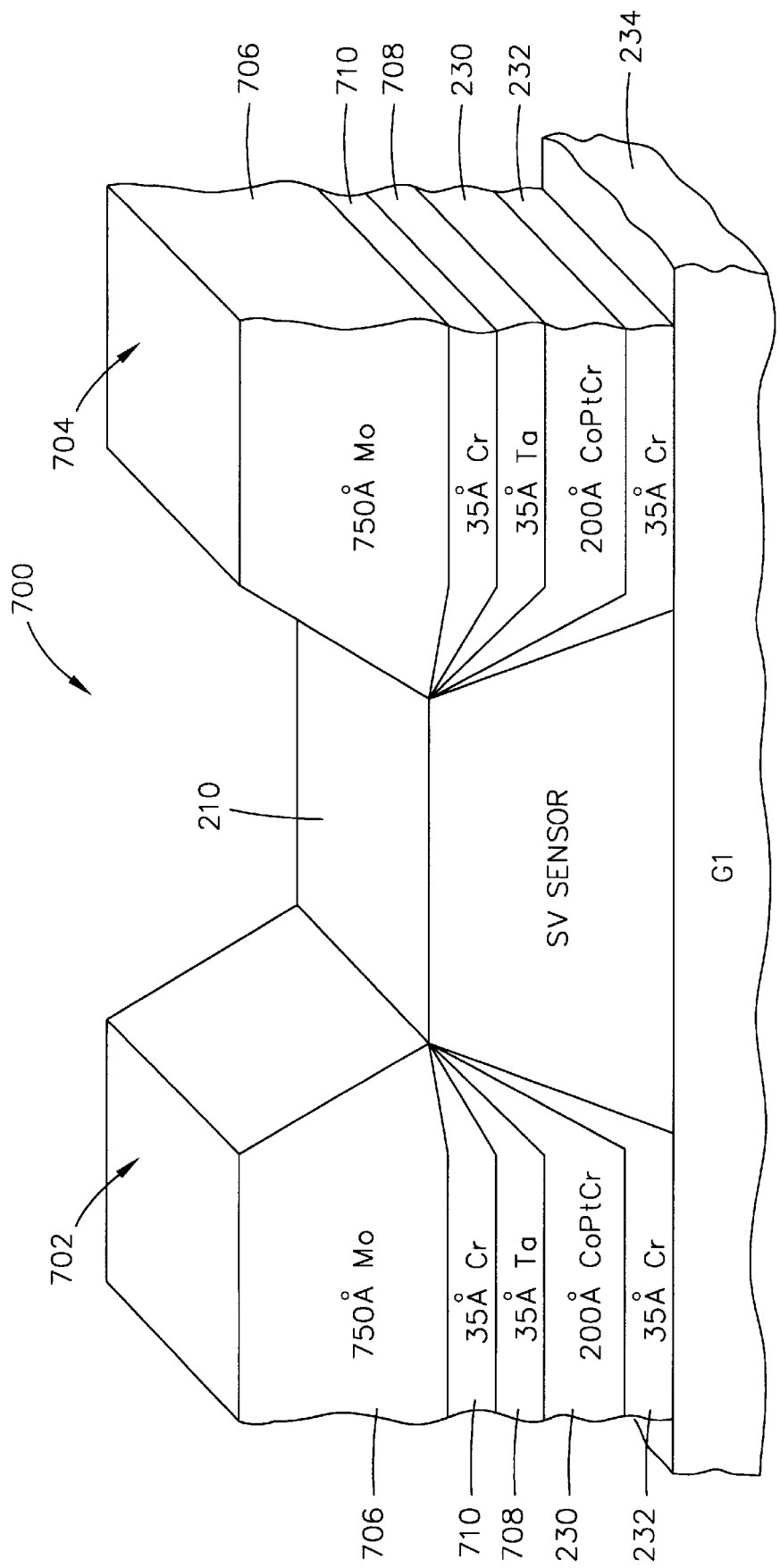
FIG. 17 is an ABS illustration of a sixth example and third embodiment of the present invention of first and second lead layer structures employing a molybdenum (Mo) layer on a seed layer structure including a first layer of tantalum (Ta) and a second layer of chromium (Cr)

FIG. 17 is an ABS illustration of a sixth example 700 and third embodiment of the invention of first and second lead layer structures 702 and 704. Example 700 is the same as example 200 in FIG. 12 except for the first and second lead layer structures 702 and 704. Each of the lead layer structures 702 and 704 includes a molybdenum (Mo) layer 706 on a multilayer seed layer structure which includes a first seed layer of tantalum (Ta) 708 and a second seed layer of chromium (Cr) 710. The second seed layer 710 is located between and interfaces the first seed layer 708 and the molybdenum (Mo) layer 706. The thickness of the molybdenum (Mo) layer is 750 Å and the thickness of each of the first and second seed layers 708 and 710 is 35 Å. The seed layer structure, including the layers 708 and 710, produced a surprising increase in conductivity of the molybdenum (Mo) 706. The resistance of the molybdenum (Mo) layer 706 was lowered by the multi seed layer structure lower than the resistance of molybdenum (Mo) per se. If the molybdenum (Mo) layer 706 is directly on the hard bias layer 230 of cobalt platinum chromium (CoPtCr) without the seed layers 708 and 710 the resistance is 1.69 ohms/sq. With the seed layers 708 and 710, the resistance of each of the first and second lead layer structures 702 and 704 was 1.14 ohms/sq. This resistance is comparable to the resistance of 1.0 for the tantalum (Ta) and gold (Au) multilayer lead structure shown in FIG. 12. Accordingly, the lead layer structures 702 and 704 are a preferred embodiment providing the desired conductivity, hardness and reliability at operating temperatures of the read head.

EXAMPLE 7

Fourth Embodiment of the Invention

Figure 18:
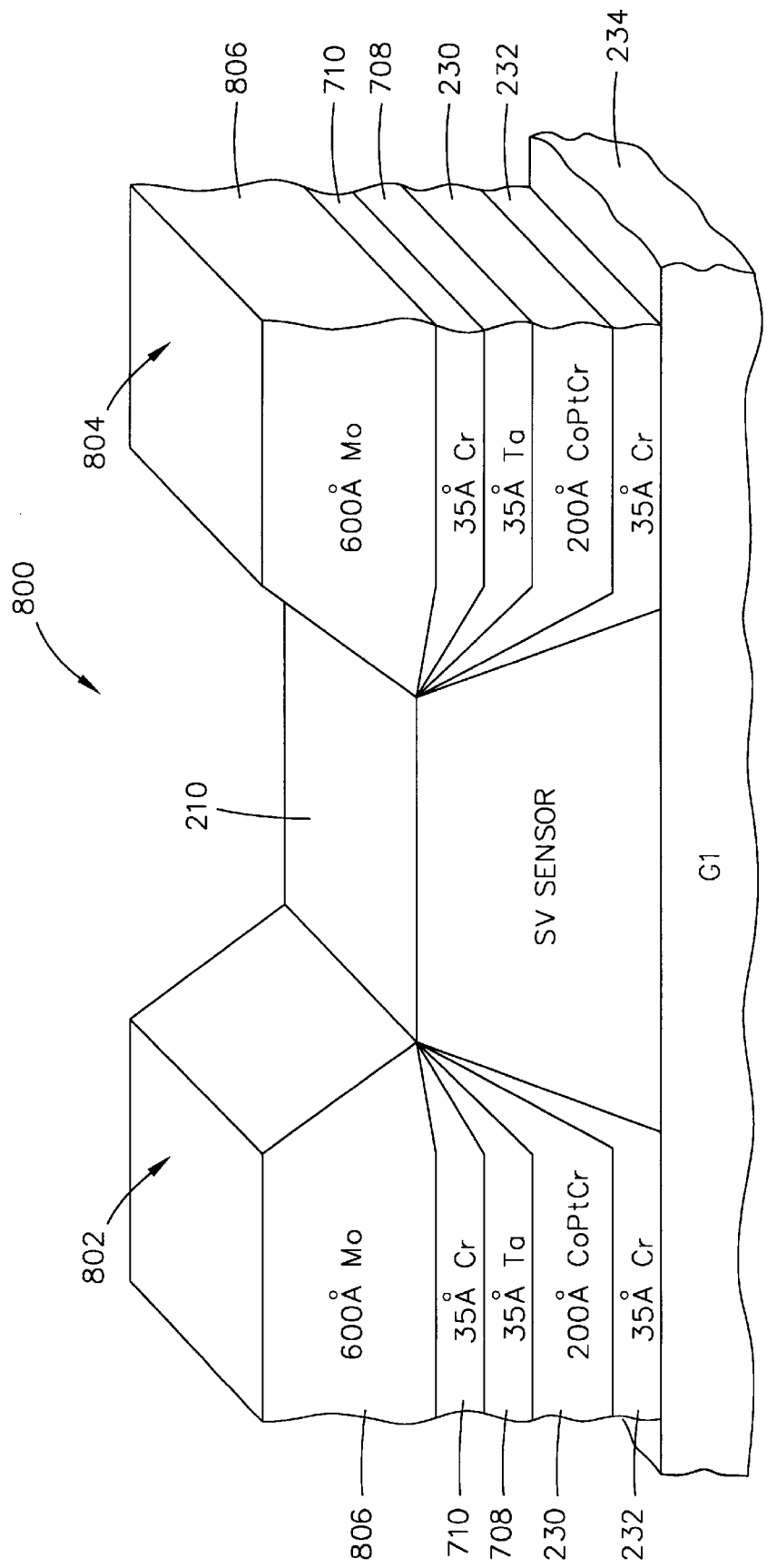
FIG. 18 is an ABS illustration of a seventh example and fourth embodiment of the present invention of first and second lead layer structures showing a reduced thickness of the molybdenum (Mo) layer on a seed layer structure including a first seed layer of tantalum (Ta) and a second seed layer of chromium (Cr).

FIG. 18 is an ABS illustration of a seventh example 800 and fourth embodiment of the invention of first and second lead layer structures 802 and 804. The lead layer structures 802 and 804 are the same as the lead layer structures 702 and 704 in FIG. 17 except for molybdenum (Mo) layers 806 which are 600 Å thick instead of 750 Å thick. The resistance of each of the lead layer structures 802 and 804 was 1.45 ohms/sq. The increase in resistance is due to the reduction in thickness of the molybdenum layers 806. However, the resistance of 1.45 is significantly less than the resistance of the lead layer structures in FIGS. 13 and 14.

OBSERVATIONS

Testing of the molybdenum layers in examples shown in FIGS. 17 and 18 show these layers to have a superior texture which promotes their low resistance. The grain size of the molybdenum (Mo) layers 706 in FIG. 17 is about 390 Å as compared to 190 Å without the tantalum (Ta) and chromium (Cr) seed layers 708 and 710 in FIG. 17. The molybdenum (Mo) layers in FIG. 17 have a very strong 110 texture as compared to molybdenum (Mo) without the seed layers 708 and 710. It is believed that the multilayer seed layer structure contributed to a desirable texture of the molybdenum layers when they were formed on the seed layer structures. The lead layer structures may be employed for any type of read sensor including spin valve and AMR sensors and read sensors with either a contiguous junction or a continuous junction. It should be understood that the multilayered seed layer structure may include additional tantalum (Ta) and chromium (Cr) layers without departing from the spirit of the invention and may be employed as capping layers instead of seed layers. Further, the hard bias layer structures may include different materials and additional layers.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

I claim:

1. A magnetic read head comprising:
    a read sensor;
    nonmagnetic conductive first and second lead layer structures;
    the first and second lead layer structures being connected to the read sensor in a spaced apart relationship;
    each of the first and second lead layer structures including a molybdenum (Mo) layer and a multilayer seed layer; and
    the multilayer seed layer of each of the first and second lead layer structures including a tantalum (Ta) seed layer and a chromium (Cr) seed layer with the chromium (Cr) seed layer being located between the tantalum (Ta) seed layer and the molybdenum (Mo) layer.

2. A magnetic read head as claimed in claim 1 including:
    nonmagnetic nonconductive first and second read gap layers;
    the read sensor and the first and second lead layer structures being located between the first and second read gap layers;
    ferromagnetic first and second shield layers; and
    the first and second read gap layers being located between the first and second shield layers.

3. A magnetic read head as claimed in claim 2 including:
    the read sensor being a spin valve sensor that has first and second side edges;
    first and second hard bias structures; and
    the first and second lead layer structures and the first and second hard bias structures being coupled to the first and second side edges of the spin valve sensor.

4. A magnetic read head as claimed in claim 3 including:
each of the first and second hard bias structures including a cobalt platinum chromium (CoPtCr) layer and a chromium (Cr) seed layer with the chromium (Cr) seed layer being located between the first read gap layer and the cobalt platinum chromium (CoPtCr) layer.

5. A magnetic head assembly including a read head and a write head and an air bearing surface (ABS) comprising:
the write head including:
ferromagnetic first and second pole piece layers;
each of the first and second pole piece layers having a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions; and
the read head including:
a read sensor;
nonmagnetic conductive first and second lead layer structures;
the first and second lead layer structures being connected to the read sensor in a spaced apart relationship;
each of the first and second lead layer structures including a molybdenum (Mo) layer and a multilayer seed layer; and
the multilayer seed layer of each of the first and second lead layer structures including a tantalum (Ta) seed layer and a chromium (Cr) seed layer with the chromium (Cr) seed layer being located between the tantalum (Ta) seed layer and the molybdenum (Mo) layer; and
nonmagnetic nonconductive first and second read gap layers;
the read sensor and the first and second lead layers being located between the first and second read gap layers;
a ferromagnetic first shield layer; and
the first and second read gap layers being located between the first shield layer and the first pole piece layer.

6. A magnetic head assembly as claimed in claim 5 including:
the read head further including:
a ferromagnetic second shield layer;
a nonmagnetic nonconductive separation layer; and
the separation layer being located between the second shield layer the first pole piece layer.

7. A magnetic head assembly as claimed in claim 5 including:
the read sensor being a spin valve sensor that has first and second side edges;
first and second hard bias structures; and
the first and second lead layer structures and the first and second hard bias structures being coupled to the first and second side edges of the spin valve sensor.

8. A magnetic head assembly as claimed in claim 7 including:
each of the first and second hard bias structures including a cobalt platinum chromium (CoPtCr) layer and a chromium (Cr) seed layer with the chromium (Cr) seed layer being located between the first read gap layer and the cobalt platinum chromium (CoPtCr) layer.

9. A magnetic disk drive having at least one slider that has an air bearing surface (ABS), the slider supporting at least one magnetic head assembly that includes a read head and a write head, the disk drive comprising:
the write head including:
first and second pole piece layers;
each of the first and second pole piece layers having a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions; and
the read head including:
a read sensor;
nonmagnetic conductive first and second lead layer structures;
the first and second lead layer structures being connected to the read sensor in a spaced apart relationship;
each of the first and second lead layer structures including a molybdenum (Mo) layer and a multilayer seed layer; and
the multilayer seed layer of each of the first and second lead layer structures including a tantalum (Ta) seed layer and a chromium (Cr) seed layer with the chromium (Cr) seed layer being located between the tantalum (Ta) seed layer and the molybdenum (Mo) layer; and
nonmagnetic nonconductive first and second read gap layers;
the read sensor and the first and second lead layers being located between the first and second read gap layers;
a ferromagnetic first shield layer; and
the first and second read gap layers being located between the first shield layer and the first pole piece layer;
a housing;
a magnetic disk rotatably supported in the housing;
a support mounted in the housing for supporting the magnetic head assembly with its ABS facing the magnetic disk so that the magnetic head assembly is in a transducing relationship with the magnetic disk;
means for rotating the magnetic disk;
positioning means connected to the support for moving the magnetic head assembly to multiple positions with respect to said magnetic disk; and
processing means connected to the magnetic head assembly, to the means for rotating the magnetic disk and to the positioning means for exchanging signals with the magnetic head assembly, for controlling movement of the magnetic disk and for controlling the position of the magnetic head assembly.

10. A magnetic disk drive as claimed in claim 9 including:
the read head further including:
a ferromagnetic second shield layer;
a nonmagnetic nonconductive separation layer; and
the separation layer being located between the second shield layer the first pole piece layer.

11. A magnetic disk drive as claimed in claim 9 including:
the read sensor being a spin valve sensor that has first and second side edges;

first and second hard bias structures; and the first and second lead layer structures and the first and second hard bias structures being coupled to the first and second side edges of the spin valve sensor.

12. A magnetic disk drive as claimed in claim 11 including:

each of the first and second hard bias structures including a cobalt platinum chromium (CoPtCr) layer and a chromium (Cr) seed layer with the chromium (Cr) seed layer being located between the first read gap layer and the cobalt platinum chromium (CoPtCr) layer.

13. A method of making a magnetic read head having an air bearing surface (ABS) comprising the unordered steps of:

forming a read sensor partially bounded by a first edge at the ABS, a recessed edge spaced from the ABS and first and second side edges;

forming nonmagnetic conductive first and second lead layers with the first lead layer abutting the first side edge of the read sensor and the second lead layer abutting the second side edge of the read sensor;

forming the first lead layer with a first layer of molybdenum (Mo) and a first multilayer seed layer and forming the second lead layer with a second layer of molybdenum (Mo) and a second multilayer seed layer;

forming the first multilayer seed layer with a first seed layer of tantalum (Ta) and a first seed layer of chromium (Cr) with the first seed layer of chromium (Cr) being located between the first seed layer of tantalum (Ta) and the first layer of molybdenum (Mo); and forming the second multilayer seed layer with a second said layer of tantalum (Ta) and a second seed layer of chromium (Cr) with the second seed layer of chromium (Cr) being located between the second seed layer of tantalum (Ta) and the second layer of molybdenum (Mo).

14. A method as claimed in claim 13 including the unordered steps of:

forming nonmagnetic nonconductive first and second read gap layers;

forming the read sensor and the first and second lead layers between the first and second read gap layers;

forming ferromagnetic first and second shield layers; and locating the first and second read gap layers between the first and second shield layers.

15. A method as claimed in claim 14 including:

exchange coupling first and second hard bias structures to the first and second side edges of the spin valve sensor whereas each hard bias structure is formed of a layer of cobalt platinum chromium (CoPtCr) and a seed layer of chromium (Cr) with the seed layer of chromium (Cr) located between the first read gap layer and the layer of cobalt platinum chromium (CoPtCr).

16. A method as claimed in claim 15 wherein the read sensor is a spin valve sensor.

17. A method of making a magnetic head assembly that has a read head and write head and an air bearing surface (ABS) comprising the unordered steps of:

making the write head as follows:

forming first and second pole piece layers with each of the first and second pole piece layers having a yoke portion located between a pole tip portion and a back gap portion;

forming a nonmagnetic write gap layer between the pole tip portions of the first and second pole piece layers;

forming an insulation stack with at least one coil layer embedded therein between the yoke portions of the first and second pole piece layers; and connecting the first and second pole piece layers at their back gap portions; and making the read head as follows:

forming a read sensor partially bounded by a first edge at the ABS, a recessed edge spaced from the ABS and first and second side edges;

forming nonmagnetic conductive first and second lead layers with the first lead layer abutting the first side edge of the sensor and the second lead layer abutting the second side edge of the sensor;

forming the first lead layer with a first layer of molybdenum (Mo) and a first multilayer seed layer and forming the second lead layer with a second layer of molybdenum (Mo) and a second multilayer seed layer;

forming the first multilayer seed layer with a first layer of tantalum (Ta) and a first seed layer of chromium (Cr) with the first seed layer of chromium (Cr) being located between the first seed layer of tantalum (Ta) and the first layer of molybdenum (Mo); and forming the second multilayer seed layer with a second seed layer of tantalum (Ta) and a second seed layer of chromium (Cr) with the second seed layer of chromium (Cr) being located between the second seed layer of tantalum (Ta) and the second layer of molybdenum (Mo).

18. A method as claimed in claim 17 wherein the making of the read head further includes:

forming a ferromagnetic second shield layer; and forming a nonmagnetic nonconductive separation layer between the second shield layer and the first pole piece layer.

19. A method as claimed in claim 17 including:

exchange coupling first and second hard bias structures to the first and second side edges of the spin valve sensor wherein each hard bias structure is formed of a layer of cobalt platinum chromium (CoPtCr) and a seed layer of chromium (Cr) with the seed layer of chromium (Cr) located between the first read gap layer and the layer of cobalt platinum chromium (CoPtCr).

20. A method as claimed in claim 19 wherein the read sensor is a spin valve sensor.

* * * * *